March 8, 1966  R. HETMANN  3,238,807
SHIFTING ARRANGEMENT
Filed July 25, 1963  2 Sheets-Sheet 1

INVENTOR
Richard HETMANN
BY Dicke + Craig
ATTORNEYS

March 8, 1966  R. HETMANN  3,238,807
SHIFTING ARRANGEMENT
Filed July 25, 1963  2 Sheets-Sheet 2

INVENTOR
Richard HETMANN
BY Dicke + Craig
ATTORNEYS

United States Patent Office 3,238,807
Patented Mar. 8, 1966

3,238,807
SHIFTING ARRANGEMENT
Richard Hetmann, Stuttgart-Weil im Dorf, Germany, assignor to Firma Dr. Ing. h.c.F. Porsche K.G., Stuttgart-Zuffenhausen, Germany
Filed July 25, 1963, Ser. No. 297,573
3 Claims. (Cl. 74—477)

The present invention relates to a shifting arrangement for multi-speed gear-wheel change-speed transmissions, especially for motor vehicles, in which the shifting of the various speeds is realized by means of a shifting finger which cooperates with several shifting rods arranged mutually parallel within the plane of a common shifting channel, of which only one shifting rod can be displaced at any one time whereas the movement of the remaining shifting rods is blocked by a blocking arrangement.

In order to avoid faulty shifting in change-speed transmissions, it is already known in the prior art to equip the shifting linkage with a locking arrangement which assures that at any one time only one of the shifting rods can be displaced in the shifting direction. Detent devices are required in these prior art arrangements in addition to the blocking arrangements, which detent devices secure the end positions of the shifting rods. For that purpose with the known prior art constructions there are coordinated to each shifting rod blocking pieces which are retained in cross bores of the transmission housing and engage in apertures of the shifting rods. Spring-loaded balls serve as detent of the shifting rods which balls are arranged within bores of the housing walls extending perpendicularly to a respective shifting rod and which engage simultaneously in corresponding apertures of the shifting rods. In order to reduce the expenditures it has already been proposed heretofore to combine the spatially separated installations into a single installation by combining a series of blocking members within mutually aligned bores of the shifting rods and of the transmission housing into a blocking chain which is under the effect of a pressure spring. However, such prior art arrangement is suitable only for transmissions in which the individual shifting rods are disposed in a common plane. Additionally, it is known in the prior art to connect with the shifting shaft supporting the shifting finger of a remote transmission shifting installation a fork-like form-piece the extensions of which extend within the shifting channel and release at any one time only one shifting rod for the shifting finger. The operative connection of the blocking arrangement with the rotatable and displaceable shifting shaft, however, entails difficulties since an exact and accurate adjustment of the blocking effect is not possible by reason of the unavoidable play and of the yielding connection in the shifting shaft.

According to the present invention, these disadvantages are avoided by constituting the blocking member by a bow-shaped member with free leg portions which extend between the shifting rods or the shifting extensions thereof and are provided within the plane of the shifting channel with an aperture for the shifting finger of the shifting linkage. By the use of such an arrangement there is achieved with the simplest means an operationally reliable blocking of the shifting rods in which the shifting rods may be arranged with respect to each other in any desired manner. If the bow-shaped member consists of an on-edge upright, U-shaped, flat band having a web portion connecting the freely extending leg portions which serves for securing the bow-shaped member at the transmission housing, then a single structural part suffices for blocking all of shifting rods of a conventional four-speed transmission. An advantageous arrangement is obtained when the leg portions of the flat band extend at a slight distance on both sides of a shifting rod which is arranged axially parallelly between adjacent shifting rods. Furthermore, for purposes of obtaining the detent engagement of the shifting rods, the free leg portions of the bow-shaped member may be constructed in a springy manner and provided with embossments or beads which, brought into engagement with corresponding apertures of the shifting rods or the shifting extensions thereof, assure at least one of the end positions thereof. As a result thereof, one single structural part suffices to achieve the desired results as regards blocking and detent of the shifting rods whereby not only the resulting costs of the transmission are considerably reduced but simultaneously therewith a simple assembly and adjustment is assured.

Accordingly, it is an object of the present invention to provide a shifting arrangement of the type mentioned hereinabove which eliminates by extremely simple means and in an operationally reliable manner the aforementioned disadvantages and shortcomings encountered with the prior art constructions.

It is another object of the present invention to provide a shifting arrangement for change-speed transmissions which permits a considerable reduction in the cost thereof without sacrifice in the reliability of operation.

A further object of the present invention resides in the provision of a shifting arrangement for a multi-speed change-speed transmission which assures a simplified assembly and greatly facilitated adjustment as well as readjustment of the transmission.

Still a further object of the present invention resides in the provision of a shifting arrangement for change-speed transmissions which requires a very small number of structural parts, and more particularly only a single structural part to provide both the blocking effect and detent engagement utilized in connection with the transmissions of the type mentioned hereinabove.

Another object of the present invention resides in the provision of a shifting arrangement for a multi-speed change-speed transmission in which the shifting rods may be arranged with respect to each other in any desired manner.

Still another object of the present invention resides in the provision of a shifting arrangement for multi-speed change-speed transmissions which permits an accurate adjustment of the blocking mechanism by extremely simple means.

These and further objects, features and advantages of the present invention will become more obvious from the following description when taken in connection with the accompanying drawing which shows, for purposes of illustration only, two embodiments in accordance with the present invention and wherein.

Figure 1:
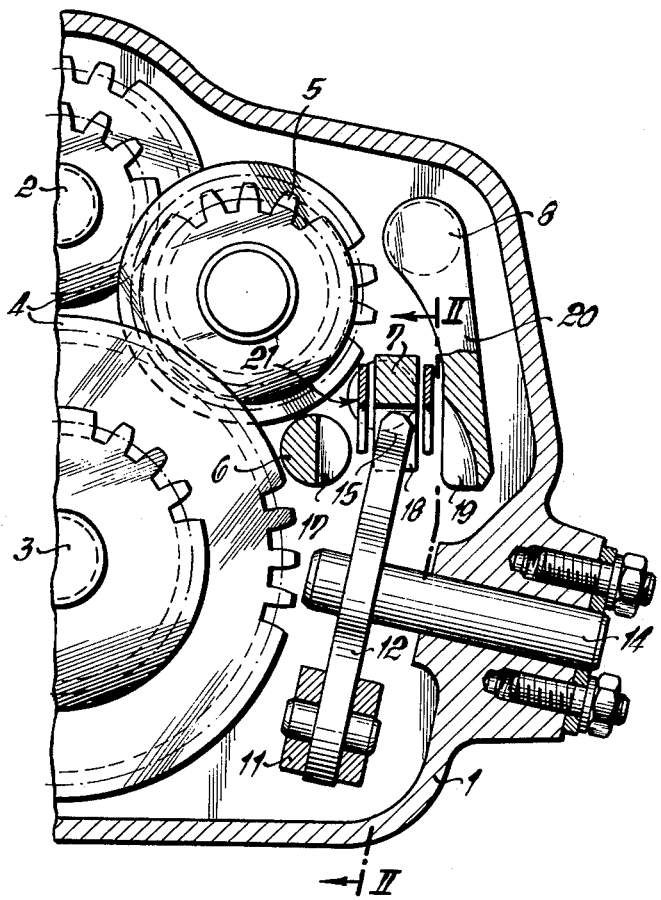
FIGURE 1 is a partial cross-sectional view through a four-speed transmission of a motor vehicle taken in a plane at right angle to the drive and driven transmission shafts, with a blocking mechanism of the shifting rods in accordance with the present invention.
Figure 3:
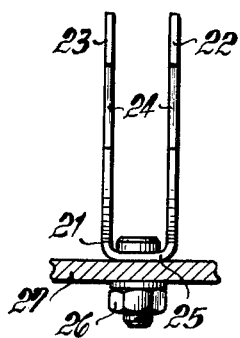
FIGURE 3 is a plan view on the blocking member in accordance with the present invention.
Figure 2:
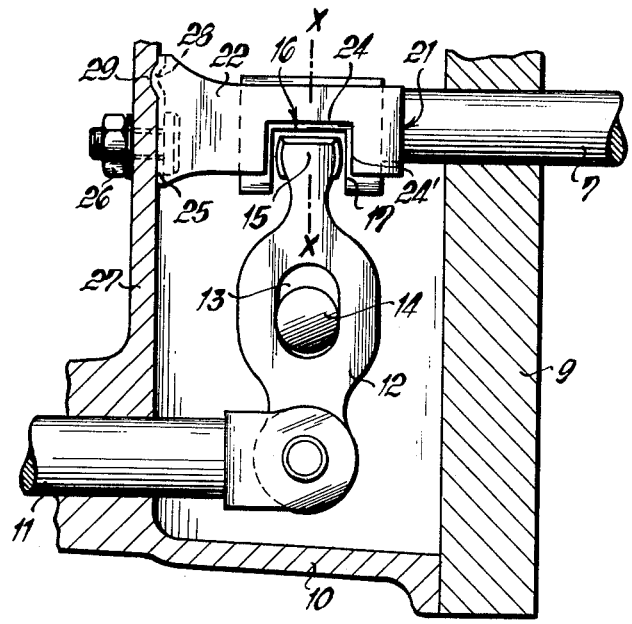
FIGURE 2 is a partial cross-sectional view through the shifting arrangement of FIGURE 1, taken along II—II of FIGURE 1.

Referring now to the drawing wherein like reference numerals are used throughout the various views to designate like parts and more particularly to FIGURES 1, 2, and 3, reference numeral 1 designates therein a transmission housing of the change-speed gear within which are supported, in a manner known per se, a transmission drive shaft 2 and a driven shaft 3. The shifting gear sets 4 of a four-speed change-speed transmission are arranged on the transmission shafts 2 and 3. Additionally, a reverse-speed countershaft gear 5 for the reversal of the direction of rotation is operatively inserted in a conventional manner between the transmission shafts 2 and 3. For purposes of engaging or changing the various transmission ratios or speeds of the change-speed gear, shifting rods 6, 7, and 8 are provided which are guided within the end wall 9 of the transmission housing 1. The end wall 9 is closed off by a cover 10 through which extends a rotatable and displaceable shifting shaft 11. The shifting shaft 11 is operatively connected in a conventional manner with the manual shifting lever arranged remote from the change-speed transmission. A shifting finger 12 is pivotally connected with the shifting shaft 11 near the end thereof adjacent the transmission which shifting finger 12, provided with an elongated aperture 13, is held swingably within two mutually perpendicular planes about a bolt 14 secured in the transmission housing 1. The head portion 15 of the shifting finger 12 comes to lie in the neutral or idling position of the transmission within the plane X—X of a shifting channel designated generally by reference numeral 16. The shifting channel 16 is effectively formed by apertures 17 and 18 of the shifting rods 6 and 7 as well as by an aperture 19 within a shifting extension 20 of the shifting rod 8, all matched to the head portion 15 of the shifting finger 12.

For purposes of blocking the shifting rods 6, 7, and 8 a bow-shaped member generally designated by reference numeral 21 and made of an on-edge upright flat band or strip material is provided of which the two free leg portions 22 and 23 extend at a distance from and on both sides of the shifting rod 7. The leg portions 22 and 23 are provided within the plane X—X of the shifting channel 16 with apertures 24 which are kept slightly wider than the head portion 15 of the shifting finger 12. The web portion 25 of the bow-shaped member 21 connecting the leg portions 22 and 23 thereof serves for fastening purposes and is connected detachably with the back wall 27 of the cover 10 by means of a screw 26. A pressed-out portion 28 provided at the web portion 25 which engages into a recessed portion 29 of the back wall 27 serves for securing the bow-shaped member 21 in the circumferential direction.

In the neutral position of the transmission illustrated in FIGURE 1 the head portion 15 of the shifting finger 12 lies in the shifting plane of the shifting rod 7 and can be brought into engagement with the apertures 17 or 19 of the shifting rods 6 or 7, respectively by rotation of the shifting shaft 11 for purposes of speed preselection within the shifting channel 16 through the apertures 24 of the leg portions 22 and 23. If the head portion 15 of the shifting finger 12 comes to a standstill, for example, by an incomplete preselection, between the shifting rod apertures 17 and 18 and if a speed-shifting operation is attempted in this position, irrespective of the shifting direction, then the head portion 15 abuts against the lateral edges 24' of the aperture 24 of a bow-shaped member 21 whereby the change in transmission ratio or speed cannot be completed. The possible movement of two shifting rods in the shifting direction is therewith prevented so that only by complete preselection, that is, when the head portion 15 of the shifting finger 12 is completely aligned or coincides with the corresponding aperture of the shifting rod, a shifting operation is possible.

Figure 4:
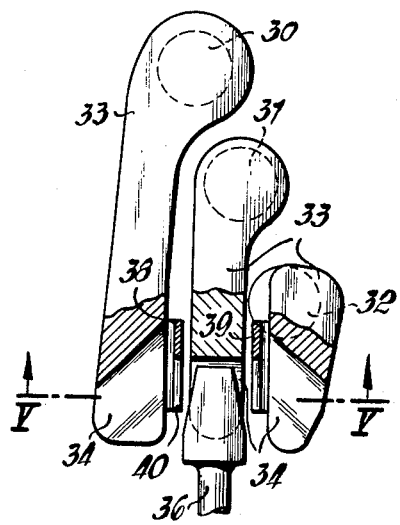
FIGURE 4 is a partial view, similar to FIGURE 1, of the pertinent parts of a modified embodiment of a shifting arrangement for a change-speed transmission in accordance with the present invention, partly in cross section.
Figure 5:
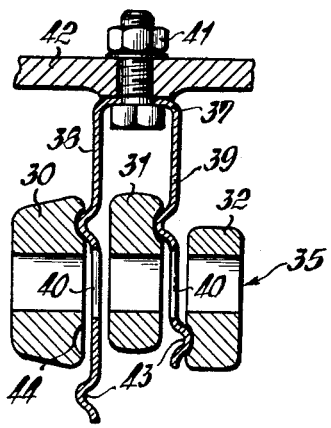
FIGURE 5 is a cross-sectional view through the blocking arrangement of FIGURE 4, taken along line V—V of FIGURE 4.

In the embodiment of FIGURES 4 and 5 a shifting arrangement is shown in which the bow-shaped member serving for blocking purposes is additionally provided with a detent arrangement for securing the end positions of the shifting rods.

Each of the shifting rods 30, 31 and 32 is provided with extensions 33 and apertures 34 which in the neutral position of the transmission form a shifting channel 35 for the indicated shifting finger 36. For purposes of locking the individual shifting rods there is provided as in the preceding described embodiment a U-shaped bow-member 37 made of an on-edge upright flat band or strip material. The free leg portions 38 and 39 of the bow-shaped member 37 extend on both sides of the extension 34 of the shifting rod 31 and are provided within the plane of the shifting channel 35 with apertures 40 for the passage of the shifting finger 36. The bow-shaped member 37 is secured by means of screw 41 at a wall 42 of the transmission housing. The leg portions 38 and 39 are constructed in a spring or resilient manner and provided with bosses or corrugations 43 for purposes of the detent engagement of the shifting rods which bosses or corrugations engage in grooves 44 provided in the extensions 33 of the individual shifting rods in order to retain the same in this manner in the initial or starting position thereof.

If one of the preselected forward speeds of the transmission is engaged, then the bosses 43 of the leg portion 39 are brought out of engagement. A detent on the shifting rods of synchronized forward speeds is, as a rule, not required since after completing the change-speed operation the shifting rods are retained by the synchronizing installation. However, the leg portion 38 of the bow-shaped member 37 is provided with a further boss or corrugation for the reverse speed adapted to be shifted by the shifting rod 30, which is not synchronized, so that the shifting rod 30 is engaged by the detent both in the neutral position as well as in an engaged position of the transmission.

While I have shown and described two embodiments in accordance with the present invention, it is understood that the same is not limited thereto but is susceptible of numerous changes and modifications. For example, the present invention is not limited to the specific embodiments illustrated but is equally applicable to the change-speed gears in which the change-gear or speed-shifting operation is carried out directly by means of the shifting lever. Furthermore, several of the bow-shaped members according to the present invention may be provided for a multi-speed transmission having a plurality of shifting rods.

Thus, it is obvious that the present invention is not limited to the details shown and described herein but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. A shifting arrangement for a multi-speed gear wheel change-speed transmission, particularly for motor vehicles in which the shifting operation of the various speeds is realized by means of a shifting finger, comprising:

a plurality of shifting rod means arranged mutually substantially parallelly and provided with aperture means forming, in the neutral position of the transmission, a common shifting channel, a housing for said change-speed transmission, a shifting finger having an end portion adapted to be received within said aperture means of said shifting rod means, means for disposing said shifting finger for swingable movement comprising a rotatable and displaceable shifting shaft pivotally connected to an end portion of said shifting finger opposite to said first-named end portion, bolt means secured to said transmission housing, and an elongated aperture in said shifting finger receiving said bolt means, and blocking means to enable only the displacement of a single one of said shifting rod means at any one time while blocking the remaining shifting rod means including bow-shaped means provided with free leg portions, said leg portions extending between some of said shifting rod means and being provided within the plane of said shifting channel with aperture means for said shifting finger means, said bow-shaped means essentially consisting of a substantially upright U-shaped flat band having a web portion connecting the free leg portions thereof, means including said web portion securing said bow-shaped means at said transmission housing.

2. A shifting arrangement for a multi-speed gear wheel change-speed transmission, particularly for motor vehicles in which the shifting operation of the various speeds is realized by means of a shifting finger, comprising:

a plurality of shifting rod means arranged mutually substantially parallelly and provided with aperture means forming, in the neutral position of the transmission, a common shifting channel, shifting finger means adapted to be received within said aperture means of said shifting rod means, and blocking means to enable only the displacement of a single one of said shifting rod means at any one time while blocking the remaining shifting rod means including bow-shaped means provided with free leg portions, said leg portions extending between some of said shifting rod means and being provided within the plane of said shifting channel with aperture means for said shifting finger means, a housing for said transmission, said bow-shaped means essentially consisting of a substantially upright U-shaped flat band having a web portion connecting the free leg portions thereof, means including said web portion securing said bow-shaped means at said transmission housing, and the free leg portions of said bow-shaped means being constructed resiliently and provided with means adapted to engage with corresponding apertures in said shifting rod means to assure by such engagement at least one of the end positions of a respective shifting rod means.

3. A shifting arrangement for a multi-speed gear wheel change-speed transmission, particularly for motor vehicles in which the shifting operation of the various speeds is realized by means of a shifting finger, comprising:

a plurality of shifting rod means arranged mutually substantially parallelly and provided with aperture means forming, in the neutral position of the transmission, a common shifting channel, shifting finger means adapted to be received within said aperture means of said shifting rod means, and blocking means to enable only the displacement of a single one of said shifting rod means at any one time while blocking the remaining shifting rod means including bow-shaped means provided with free leg portions, said leg portions extending between some of said shifting rod means and being provided within the plane of said shifting channel with aperture means for said shifting finger means, and the free leg portions of said bow-shaped means being constructed resiliently and provided with means adapted to engage with corresponding apertures in said shifting rod means to assure by such engagement at least one of the end positions of a respective shifting rod means.

References Cited by the Examiner
UNITED STATES PATENTS
2,320,454   6/1942   Eberhard _____ 74—477

MILTON KAUFMAN, *Primary Examiner.*